(12) United States Patent
    Plattner

(10) Patent No.: US 11,503,755 B2
(45) Date of Patent: Nov. 22, 2022

(54) METHOD TO PREVENT DRIFT OF AN AGRICULTURAL IMPLEMENT

(71) Applicant: Precision Planting, LLC, Tremont, IL (US)

(72) Inventor: Chad Plattner, Tremont, IL (US)

(73) Assignee: Precision Planting LLC, Tremont, IL (US)

( * ) Notice: Subject to any disclaimer, the term of this patent is extended or adjusted under 35 U.S.C. 154(b) by 323 days.

(21) Appl. No.: 16/616,107

(22) PCT Filed: May 29, 2018

(86) PCT No.: PCT/US2018/034961
    § 371 (c)(1),
    (2) Date: Nov. 22, 2019

(87) PCT Pub. No.: WO2018/218255
    PCT Pub. Date: Nov. 29, 2018

(65) Prior Publication Data
    US 2020/0154627 A1    May 21, 2020

Related U.S. Application Data

(60) Provisional application No. 62/511,716, filed on May 26, 2017.

(51) Int. Cl.
    *A01B 63/32*    (2006.01)
    *A01C 5/06*    (2006.01)

(52) U.S. Cl.
    CPC ............. *A01B 63/32* (2013.01); *A01C 5/064* (2013.01)

(58) Field of Classification Search
    CPC .................. A01B 63/245; A01B 63/32; A01C 5/062–068
    See application file for complete search history.

(56) References Cited

U.S. PATENT DOCUMENTS

| 5,065,681 | A  | 11/1991 | Hadley |
| 6,389,999 | B1 | 5/2002  | Duello |
| 8,386,137 | B2 | 2/2013  | Sauder et al. |
| 8,561,472 | B2 | 10/2013 | Sauder et al. |
| 9,801,322 | B2 | 10/2017 | Sauder et al. |

(Continued)

FOREIGN PATENT DOCUMENTS

| EP | 2 554 037 A1 | 2/2013 |
| EP | 2 806 721 A2 | 12/2014 |

(Continued)

OTHER PUBLICATIONS

United States Patent and Trademark Office—ISA, International Search Report prepared for International Application No. PCT/US2018/034961, dated Aug. 23, 2018.

(Continued)

*Primary Examiner* — Tara Mayo-Pinnock

(57) ABSTRACT

A method to prevent drift in an agricultural implement. Drift is when one side of an agricultural implement is further behind or further ahead of the other side of the agricultural implement in a direction of travel. Drift can be controlled by increasing a downforce on the side that is further ahead, decreasing force on the side that is further behind, or a combination of both. The force can be a moment of force.

18 Claims, 12 Drawing Sheets

(56) References Cited

U.S. PATENT DOCUMENTS

| | | |
|---|---|---|
| 2010/0162931 A1 | 7/2010 | Van Drimmelen et al. |
| 2010/0198529 A1* | 8/2010 | Sauder et al. ....... A01B 63/114 |
| | | 702/41 |
| 2012/0186503 A1* | 7/2012 | Sauder et al. ......... A01B 63/22 |
| | | 111/134 |
| 2013/0032362 A1 | 2/2013 | Rylander |
| 2014/0000919 A1 | 1/2014 | Bachman et al. |
| 2014/0214284 A1 | 7/2014 | Sauder et al. |
| 2015/0013579 A1 | 1/2015 | Mariman et al. |
| 2016/0044857 A1 | 2/2016 | Sporrer et al. |
| 2018/0325020 A1* | 11/2018 | Connell et al. ........ A01B 79/02 |

FOREIGN PATENT DOCUMENTS

| | | |
|---|---|---|
| EP | 3 065 526 A1 | 9/2016 |
| WO | 2013022835 A1 | 2/2013 |
| WO | 2014018717 A1 | 1/2014 |
| WO | 2015070115 A1 | 5/2015 |
| WO | 2016099386 A1 | 6/2016 |

OTHER PUBLICATIONS

European Patent Office, Search Report for related European Application No. EP 18 80 6192, dated Mar. 1, 2021.

\* cited by examiner

METHOD TO PREVENT DRIFT OF AN AGRICULTURAL IMPLEMENT

BACKGROUND

When operating an agricultural implement, such as a planter, an air seeder, grain drill, or tillage implement, the agricultural implement can drift from side to side as the agricultural implement traverses a field, rather than traveling straight with respect to the forward direction of travel. Implement drift can be caused by different forces being realized by the left and right sides of the agricultural implement. It is desired that the agricultural implement travel straight with respect to the forward direction of travel.

DESCRIPTION

Figure 1A:
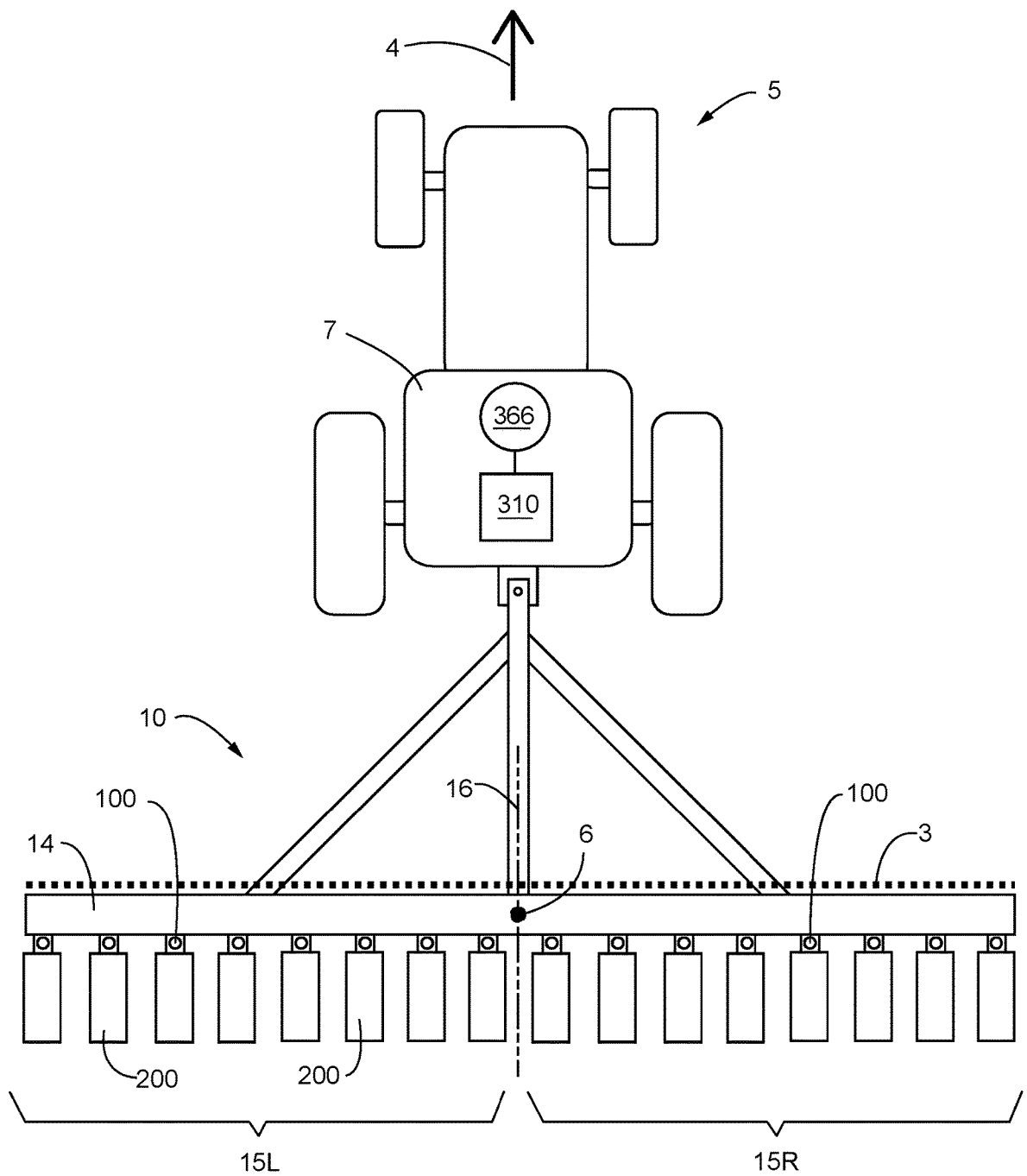
FIG. 1A is a top schematic view of an embodiment of an agricultural implement shown as a row planter being drawn by a tractor with each row unit of the row planter having a variably adjustable downforce actuator.
Figure 1B:
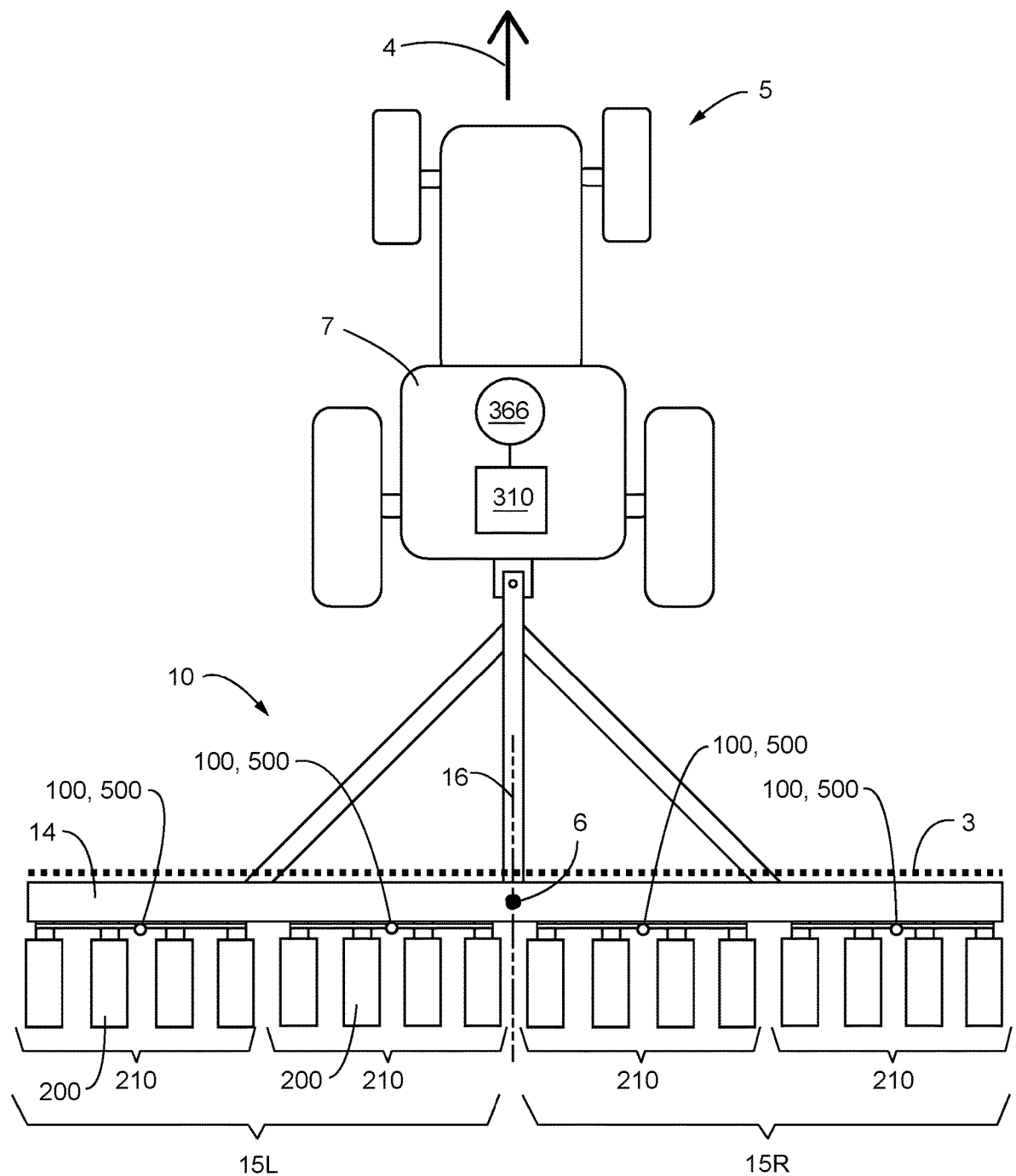
FIG. 1B is a top schematic view of an embodiment of an agricultural implement shown as a row planter being drawn by a tractor with the row planter having tool sections with a variably adjustable downforce actuator associated with each tool section.

Referring now to the drawings, wherein like reference numerals designate identical or corresponding parts throughout the several views, FIGS. 1A and 1B illustrate a tractor 5 drawing and agricultural implement 10 (e.g., a row planter) through a field in a forward direction of travel as indicated by arrow 4. The agricultural implement 10 includes a toolbar operatively supporting a plurality of tools 200 (e.g., planter row units). The toolbar 14 includes a right side 15R and a left side 15L with respect to a centerline 16 or midpoint 6 of the toolbar. A transverse line 3 is shown along the toolbar 14 extending perpendicular to the forward direction of travel.

It should be appreciated that while FIGS. 1A and 1B show the agricultural implement 10 as a row planter, the agricultural implement 10 may be any type of agricultural implement, including an air seeder, grain drill, or a tillage implement where it may be desired to minimize or control drift as the implement traverses the field. Therefore, depending on the type of agricultural implement 10, the tools 200 may be planter row units, grain drill units, or tillage tools. For purposes of this disclosure tools and row units are used interchangeably.

Variably adjustable downforce actuators (such as downforce controllers 100, 500 discussed below) are disposed to apply a varying or adjustable downforce on the tools 200 as the agricultural implement 10 traverses the field. The variably adjustable downforce actuators may be hydraulic, pneumatic or electrical. As shown in FIG. 1A, each tool 200 may have its own variably adjustable downforce actuator applying a downforce to that tool 200. In an alternative embodiment as shown in FIG. 1B, one variably adjustable downforce actuator may be associated with multiple tools 200 comprising a tool section 210, such that the one variably adjustable downforce actuator (such as downforce controllers 100, 500 discussed below) applies a varying or adjustable downforce across all of the tools 200 comprising the tool section 210. There may be one or more tool sections 210 on each of the respective right and left sides 15R, 15L of the toolbar 14.

Variably Adjustable Downforce Actuators

Figure 4:
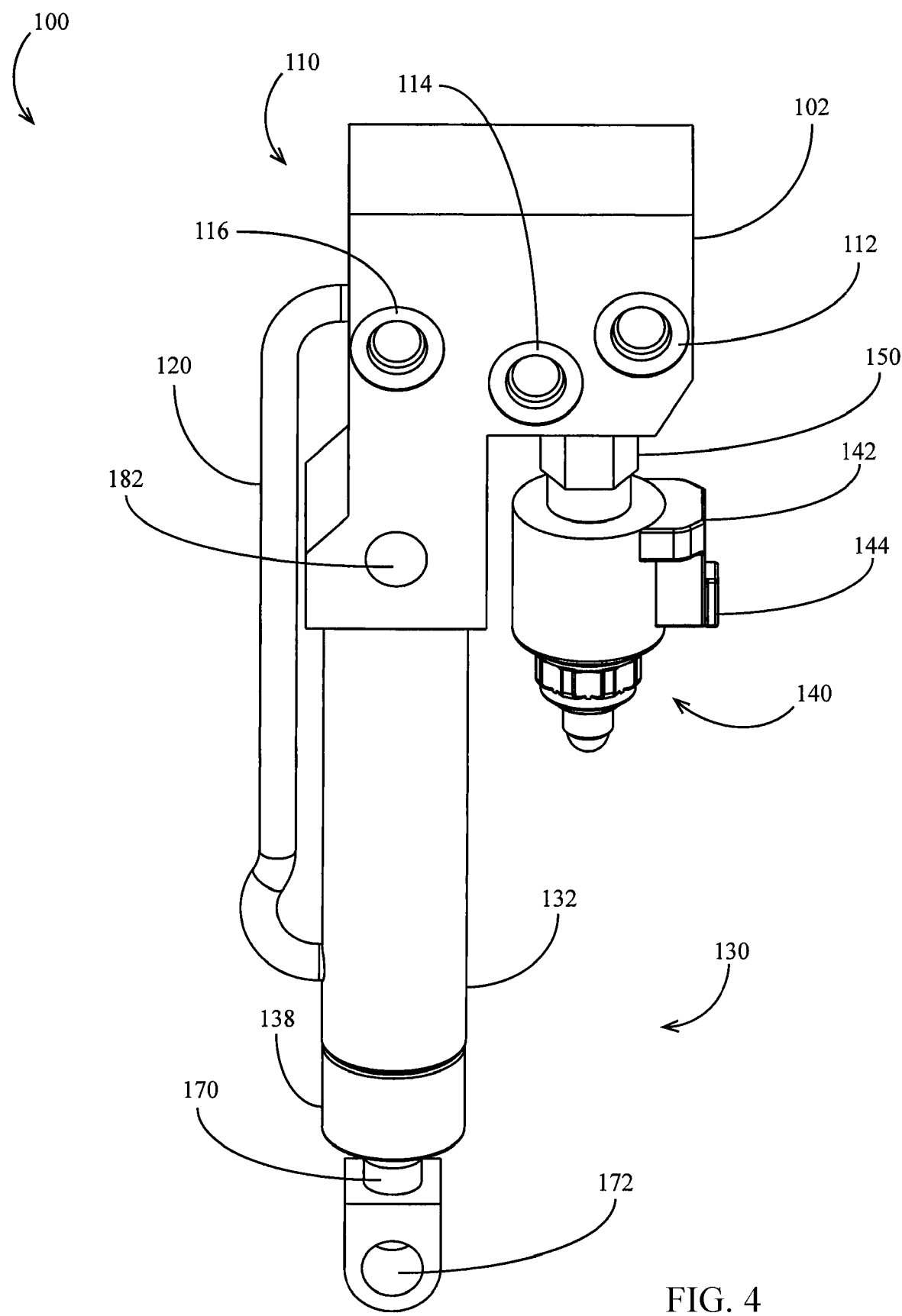
FIG. 4 is a perspective view of an embodiment of a downforce controller.
Figure 5:
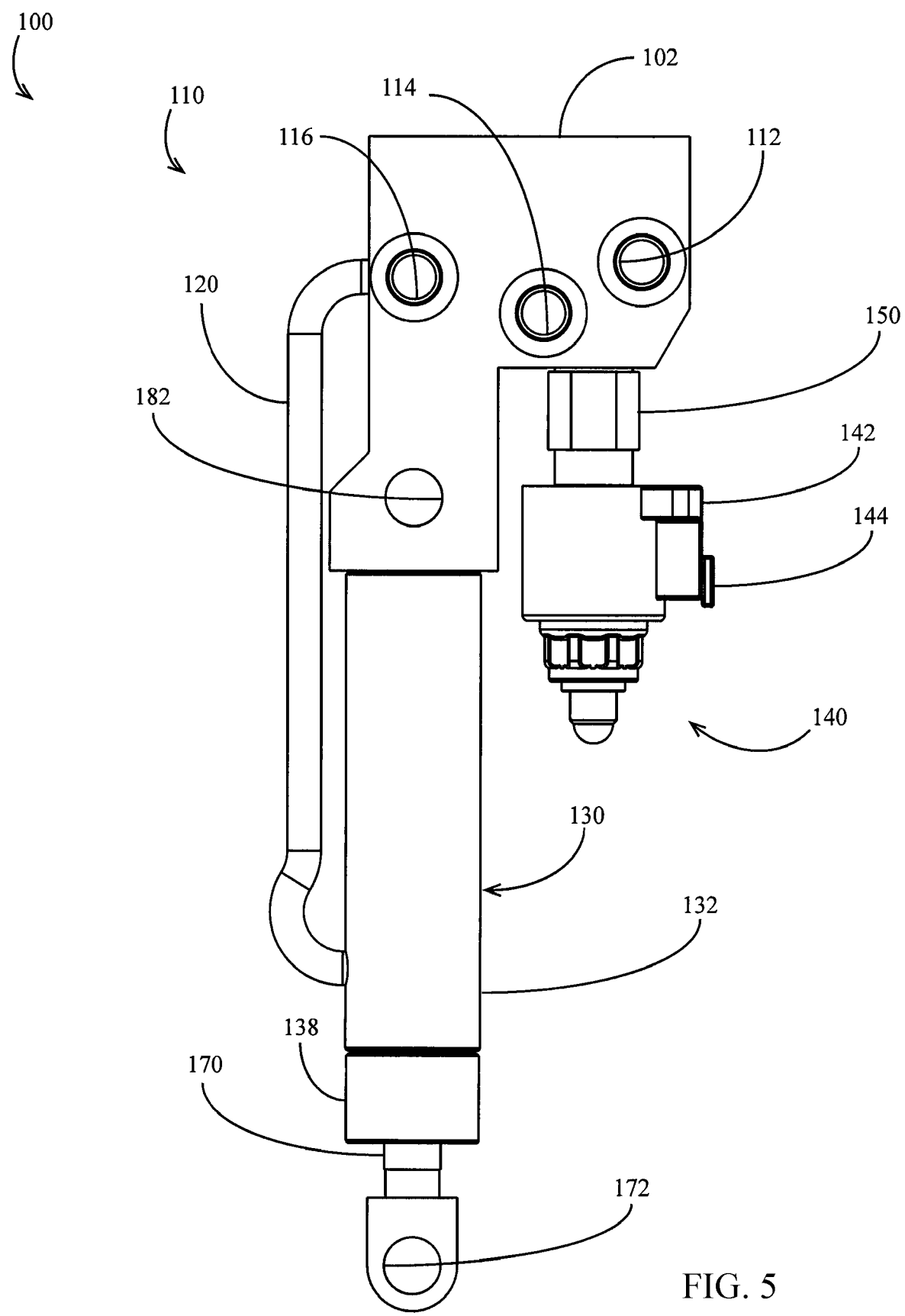
FIG. 5 is a side elevation view of an embodiment of the downforce controller of FIG. 4.
Figure 6:
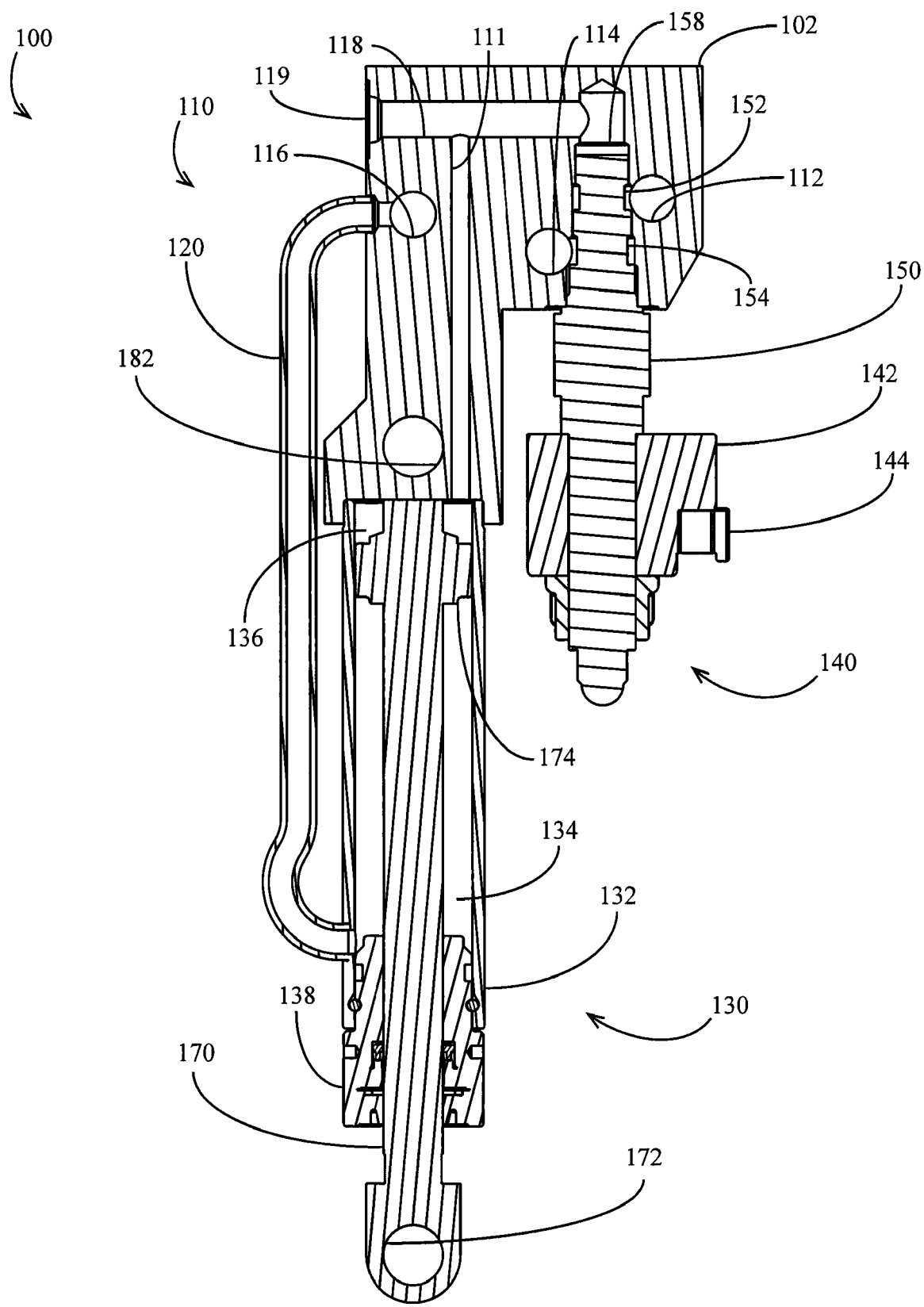
FIG. 6 is a cross-sectional view of the downforce controller of FIG. 4.

FIGS. 4-6 illustrate one embodiment of a hydraulic variably adjustable downforce actuator (hereinafter identified as a "downforce controller" 100). Referring to FIG. 4, the downforce controller 100 includes a manifold 110 and a cylinder 130. The manifold 110 includes a manifold body 102, a lift control conduit 120, and a cavity sized to receive a down pressure control valve 140. It should be appreciated that as illustrated in FIGS. 4-6, the down pressure control valve 140 is coupled to the manifold 110 and is thus coupled to the cylinder 130; likewise, the valve is supported by the manifold 110 and is thus supported by the cylinder 130. The manifold body 102 includes a supply passage 112, a return passage 114, and a lift control passage 116. Each passage 112, 114, 116 includes a left fitting, a right fitting, and an aperture connecting the left and right fittings. Referring to the cross-sectional view of FIG. 6, the manifold body 110 includes a control pressure diagnostic passage 118 and a down chamber connection passage 111.

The cylinder 130 includes a barrel 132, a rod 170, and a gland 138. The cylinder 130 is mounted to the manifold 110. In the embodiment illustrated in FIGS. 4-6, the barrel 132 is mounted to the manifold body 102. Referring to the cross-sectional view of FIG. 6, the gland 138 is mounted to a lower end of the barrel 132 and the rod 170 is slidably mounted within the gland 138. The rod 170 includes a piston 174 which separates an interior volume of the barrel 132 into a down chamber 136 and a lift chamber 134.

The down pressure control valve 140 may be an electro-hydraulic pressure reducing-relieving valve and may include a solenoid 142 having an electrical port 144. The down pressure control valve 140 may include a flow control valve 150 having a supply port 152, a return port 154, and a control port 158 (FIG. 1C). The pressure control valve 140 may be a PDR08-P proportional pressure relief valve available from Hydac International GmbH in Sulzbach, Germany ("Hydac"). The down pressure control valve 140 may be mounted to the manifold body 102 and may be oriented substantially parallel with the cylinder 130.

Referring to FIG. 6 the supply port 152 of the pressure control valve 140 is in fluid communication with the supply passage 112. The return port 154 is in fluid communication with the return passage 114. The control port 158 is in fluid communication with the control pressure diagnostic passage 118. The control pressure diagnostic passage 118 is in fluid communication with the down chamber connection passage 111. The down chamber connection passage 111 is in fluid communication with the down chamber 136. The control pressure diagnostic passage 118 and the down chamber connection passage 111 collectively comprise a passage placing the control port 158 in fluid communication with the down chamber 136. The conduit 120 places the lift control passage 116 in fluid communication with the lift chamber 134. The control pressure diagnostic passage 118 may be capped with a cap 119 which may be removed in order to place a gauge, transducer, or other pressure measurement device in fluid communication with the control port 158.

In operation, the flow control valve 150 establishes a control pressure at the control port 158 by selectively allowing flow between the control port 158, the supply port 152, and the return port 154 as is known in the art. The solenoid 142 changes an operating state of the down pressure control valve 140 (e.g., by imposing a force on a component of the flow control valve 150) to modify the control pressure as is known in the art. The control pressure set by the solenoid 142 may correspond to a signal received at the electrical port 144. Thus, the down pressure control valve 140 is configured to maintain any one of a continuous range of pressures at the control port 152, and is further configured to selectively maintain one of such continuous range of pressures based on the signal received by the solenoid 142.

Figure 2:
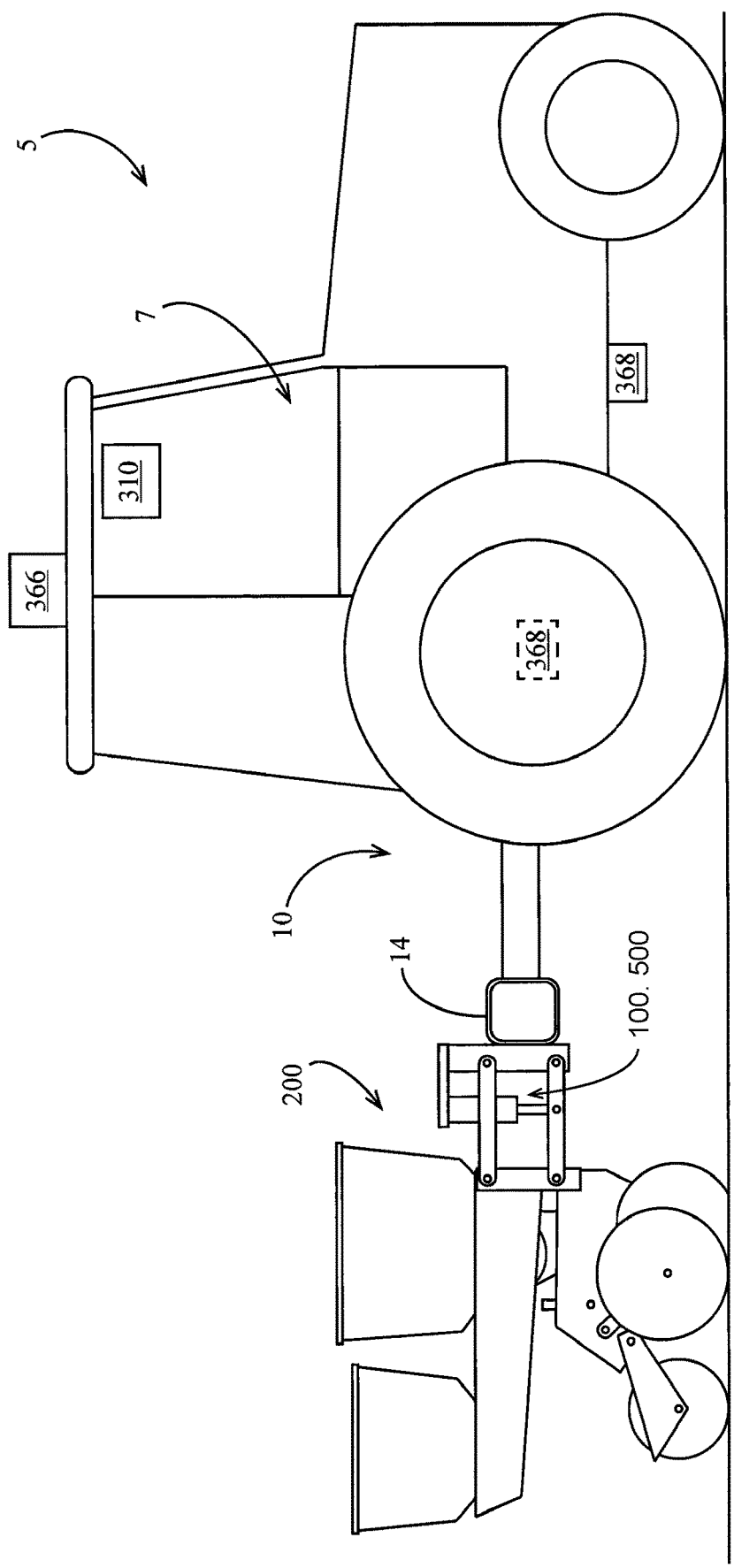
FIG. 2 is a side elevation view of the row planter and tractor of FIG. 1A.
Figure 3:
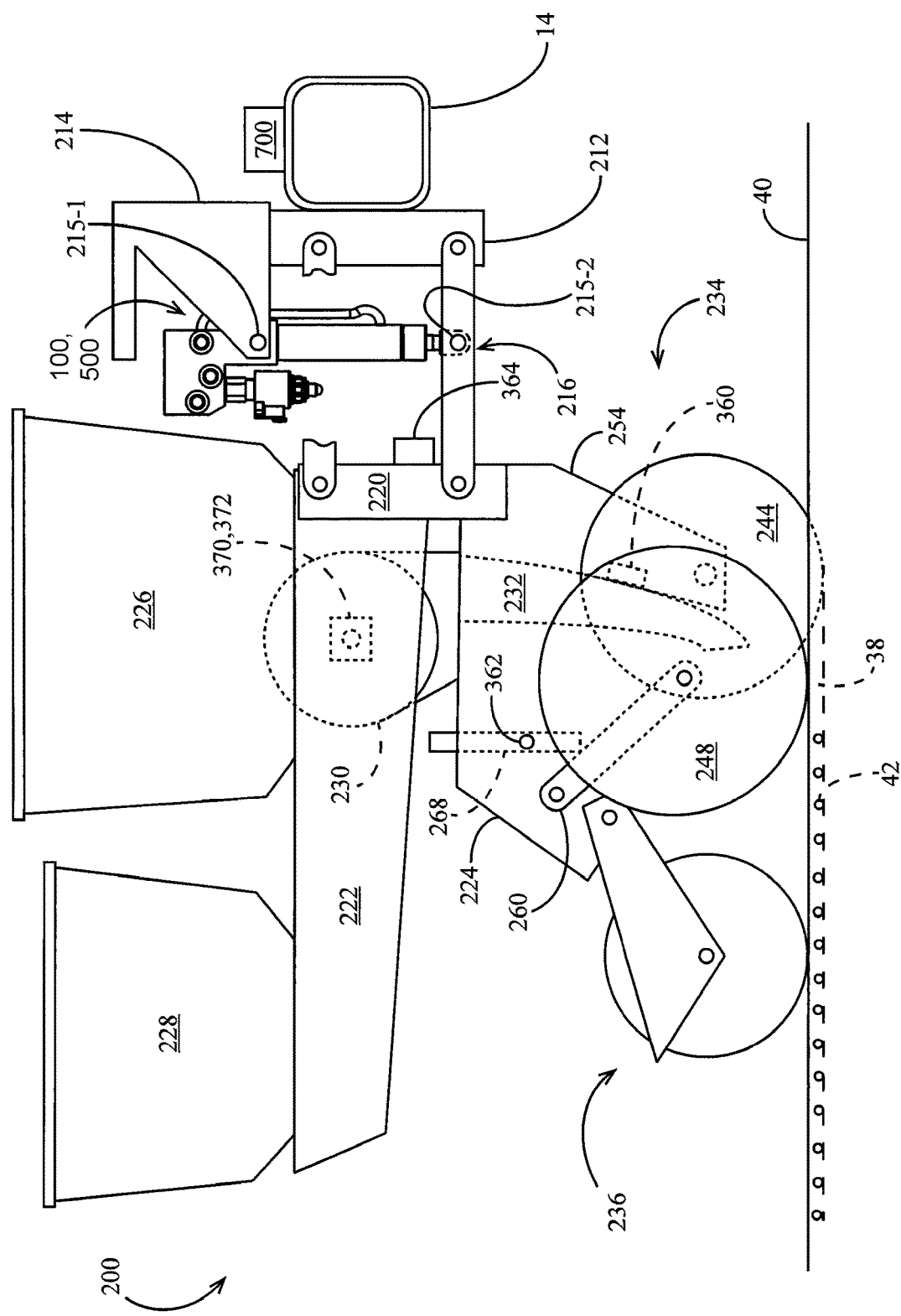
FIG. 3 is an enlarged and more detailed side elevation view of a row unit of the planter of FIG. 1A.

Referring to FIGS. 2 and 3, for attachment purposes, the manifold body 102 of the downforce controller 100 includes a pin eye 182 (FIGS. 3-6) and the rod 170 includes a clevis 172. Referring to FIG. 3, a controller attachment bracket 214 is mounted to the front bracket 212 of the row unit 200. The downforce controller 100 is pivotally connected to the controller attachment bracket 214 by an upper pin 215-1 extending through the pin eye 182. The downforce controller 100 is pivotally connected at a lower end to a parallel linkage 216 by a lower pin 215-2 extending through the clevis 172. A manifold 700 may be mounted to the toolbar 14.

Continuing to refer to FIG. 3, the parallel linkage 216 supports the row unit 200 from the toolbar 14, permitting each row unit to move vertically independently of the toolbar and the other spaced row units in order to accommodate changes in terrain or upon the row unit encountering a rock or other obstruction as the planter is drawn through the field. A ride quality sensor 364, such as an accelerometer, is mounted to the row unit 200 and disposed to measure the vertical velocity and acceleration of the row unit 200. Each row unit 200 further includes a mounting bracket 220 to which is mounted a hopper support beam 222 and a subframe 224. The hopper support beam 222 supports a seed hopper 226 and a fertilizer hopper 228 as well as operably supporting a seed meter 230 and a seed tube 232. The subframe 224 operably supports a furrow opening assembly 234 and a furrow closing assembly 236.

In operation of the row unit 200, the furrow opening assembly 234 cuts a furrow or seed trench 38 into the soil surface 40 as the planter 10 is drawn through the field. The seed hopper 226, which holds the seeds to be planted, communicates a constant supply of seeds 42 to the seed meter 230. The seed meter 230 of each row unit 200 is selectively engaged to a drive 372 via a clutch 370 such that individual seeds 42 are metered and discharged into the seed tube 232 at regularly spaced intervals based on the seed population desired and the speed at which the planter is drawn through the field. The drive 372 and clutch 370 may be of the types disclosed in U.S. Patent Publication No. US2010/0162931 the disclosure of which is incorporated herein in its entirety by reference. A seed sensor 360, such as an optical sensor, is supported by the seed tube 232 and disposed to detect the presence of seeds 42 as they pass. The seed 42 drops from the end of the seed tube 232 into the furrow 38 and the seeds 42 are covered with soil by the closing wheel assembly 236.

The furrow opening assembly 234 may include a pair of furrow opening disk blades 244 and a pair of gauge wheels 248 selectively vertically adjustable relative to the disk blades 244 by a depth adjusting mechanism 268. The depth adjusting mechanism 268 pivots about a downforce sensor 362, which may comprise a pin instrumented with strain gauges for measuring the force exerted on the gauge wheels 248 by the soil 40. The downforce sensor 362 is may be of the type disclosed in U.S. Pat. No. 8,561,472, the disclosure of which is hereby incorporated herein in its entirety by reference. In other embodiments, the downforce sensor is of the types disclosed in U.S. Pat. No. 6,389,999, the disclosure of which is hereby incorporated herein in its entirety by reference. The disk blades 244 are rotatably supported on a shank 254 depending from the subframe 224. Gauge wheel arms 260 pivotally support the gauge wheels 248 from the subframe 224. The gauge wheels 248 are rotatably mounted to the forwardly extending gauge wheel arms 260.

Figure 7:
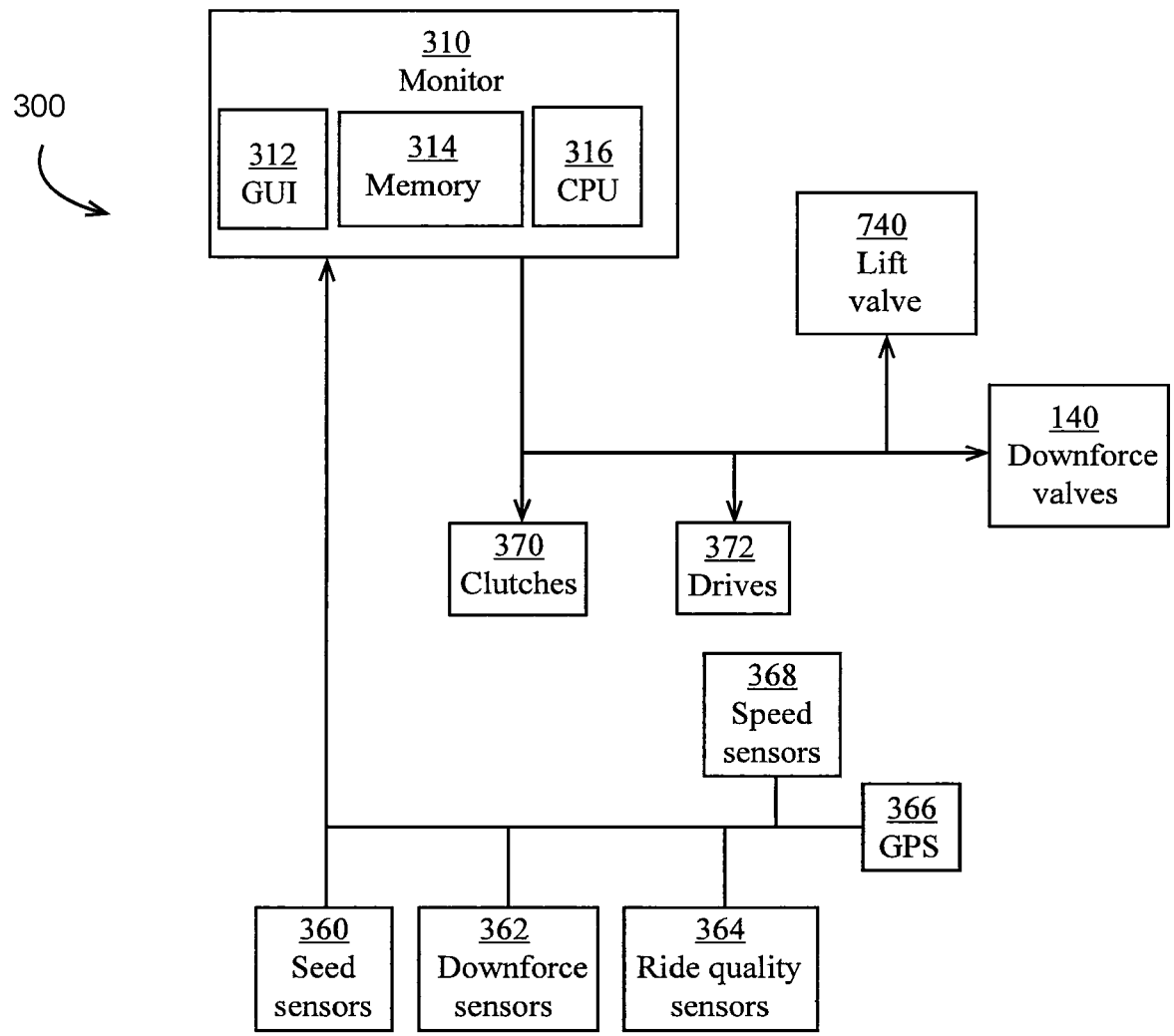
FIG. 7 schematically illustrates an embodiment of an electronic control system for controlling one or more downforce controllers.

Referring to FIGS. 2 and 7, an electrical control system 300 for controlling and measuring downforce and other implement functions is illustrated schematically. As shown in FIG. 2, a GPS receiver 366 may be mounted to an upper portion of the tractor 5 and a monitor 310 may be mounted in a cab 7 of the tractor 5. One or more speed sensors 368, such as a Hall-effect wheel speed sensor or a radar speed sensor, may also be mounted to the tractor 5.

Figure 11:
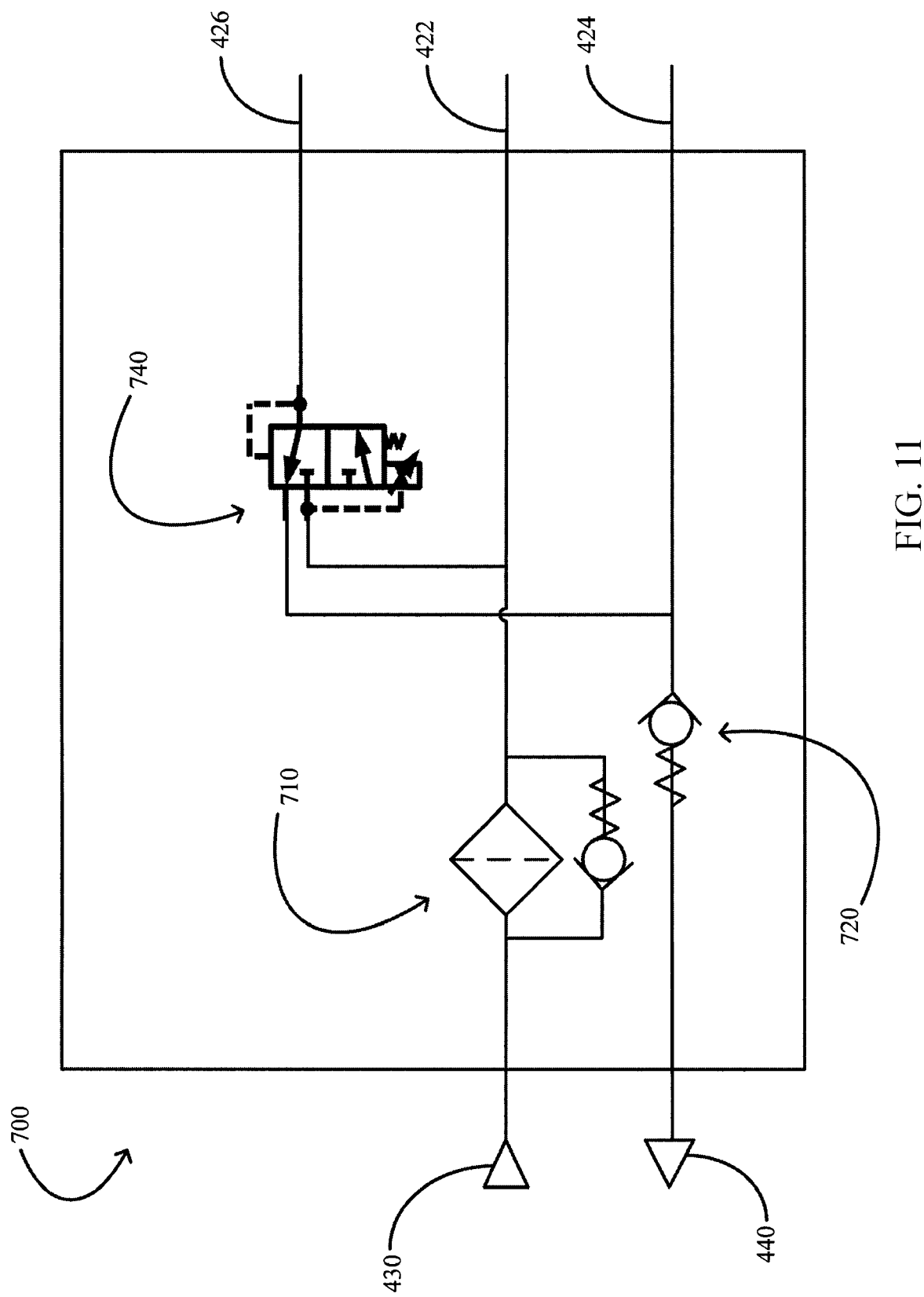
FIG. 11 is a fluid schematic illustrating an embodiment of a manifold for controlling pressure delivered to a downforce controller.

The monitor 310 is in electrical communication with the down pressure control valves 140 and a lift pressure control valve 740 (described herein with respect to FIG. 11), as well as the drives 370 and the clutches 372. The monitor 310 is in electrical communication with the downforce sensors 362 as well as the seed sensors 360, the downforce sensors 362, the speed sensors 368, and the GPS receiver 366. It should be appreciated that the monitor 310 comprises an electronic controller.

The monitor 310 may include a central processing unit ("CPU") 316, a memory 314, and a graphical user interface ("GUI") 312 allowing the user to view and enter data into the monitor 310. The monitor 310 may be of the type disclosed in U.S. Pat. No. 8,386,137 the disclosure of which is hereby incorporated herein in its entirety by reference, such that the monitor 310 is capable of displaying downforce and seeding information to the user.

Alternatively, control can be implemented with a multi-row controller or single-row controller as described in PCT Publication No. WO2014018717, which is incorporated herein by reference in its entirety.

Figure 8:
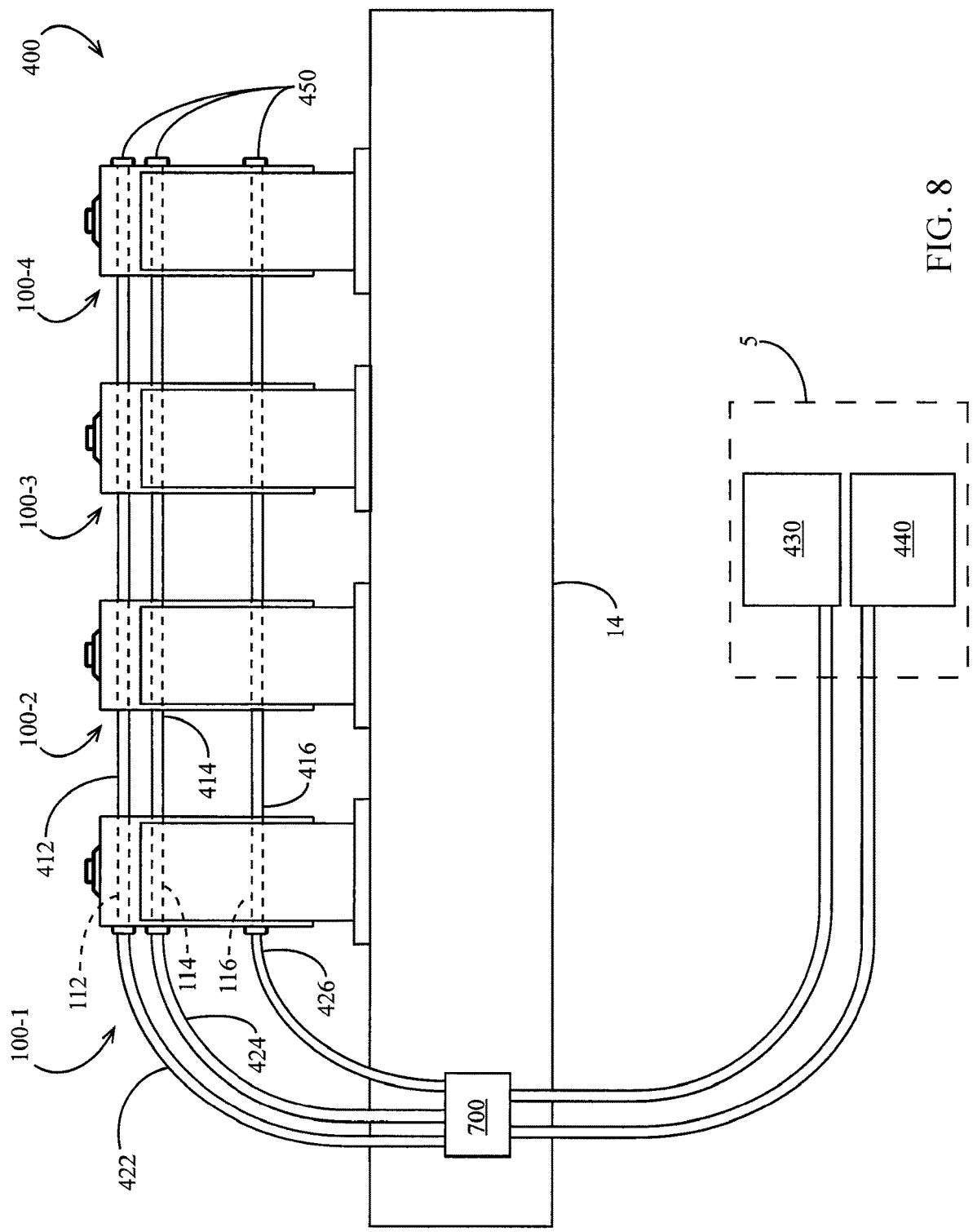
FIG. 8 is a top view of an embodiment of a fluid control system for controlling multiple downforce controllers.

Turning to FIG. 8, an embodiment of a fluid control system 400 is illustrated in connection with four downforce controllers 100, each of which may be coupled to a respective row unit 200 (not shown), supported from the toolbar 14. The fluid control system includes a supply 430, which may be a power-beyond supply port located on the tractor 5, and a tank 440, which may be a power-beyond tank port located on the tractor 5. The supply 430 and tank 440 are in fluid communication with the manifold 700.

In another embodiment, a manifold includes a filter (such as Model No. CP-SAE-120 available from Hydac), a check valve (such as Model No. RV16A-01 available from Hydac), a float select valve (such as Model No. PD10-41-0-N-170 available from Hydraforce, Inc., 500 Barclay Blvd., Lincolnshire, Ill. 60069), and the lift pressure control valve (such as an equivalent valve to the down pressure control valve 140 identified above). The supply 430 is in fluid communication with the filter, a pressure port of the lift pressure control valve, and a supply hose 422 connected to a supply port of the manifold. The tank 440 is in fluid communication with the check valve, a tank port of the lift pressure control valve, and a return hose 424 connected to a return port of the manifold. A control port of the lift pressure control valve is in fluid communication with a first port of the float select valve. A second port of the float select valve is in fluid communication with the return hose 424. A third port of the float select valve is in fluid communication with a lift control hose 426 connected to a lift control port of the manifold.

In operation, the lift pressure control valve receives a command signal and maintains a desired pressure at the control port of the lift pressure control valve corresponding to the command signal. When the pressure in the lift control hose 426 exceeds the pressure in the return hose 424 by a threshold (e.g., 170 psi), as for example when one or more of the row units 200 drops relative to the toolbar causing substantial fluid flow from the lift control hose through the float select valve 735, the float select valve may be configured to shift into a position such that fluid is allowed to bypass the lift pressure control valve and return to the return hose 424.

Returning to FIG. 8, the supply hose 422 is in fluid communication with the supply passage 112 of the first downforce controller 100-1. The supply passage 112 of each downforce controller 100 is in fluid communication with the supply passage 112 of an adjacent downforce controller 100 via an inter-row supply hose 412. The distal port of the supply passage 112 of the distal downforce controller (e.g., the right-hand port of the supply passage of the downforce controller 100-4 as illustrated in FIG. 8) may be capped with a cap 450. It should be appreciated in view of FIG. 4 and the description above that a first end of the inter-row supply hose 412 is coupled to and supported by the supply passage 112 of a first downforce controller (e.g., the downforce controller 100-1) and a second end of the inter-row supply hose 412 is coupled to and supported by the supply passage 112 of a second, preferably adjacent downforce controller (e.g., the downforce controller 100-2).

The return hose 424 is in fluid communication with the return passage 114 of the first downforce controller 100-1. The return passage 114 of each downforce controller 100 is in fluid communication with the return passage 114 of an adjacent downforce controller 100 via an inter-row return hose 414. The distal port of the return passage 114 of the distal downforce controller (e.g., the right-hand port of the return passage of the downforce controller 100-4 as illustrated in FIG. 8) is capped with a cap 450. It should be appreciated in view of FIG. 4 and the description above that a first end of the inter-row return hose 414 is coupled to and supported by the return passage 114 of a first downforce controller (e.g., the downforce controller 100-1) and a second end of the inter-row return hose 414 is coupled to and supported by the return passage 114 of a second, preferably adjacent downforce controller (e.g., the downforce controller 100-2).

The lift control hose 426 is in fluid communication with the lift control passage 116 of the first downforce controller 100-1. The lift control passage 116 of each downforce controller 100 is in fluid communication with the lift control passage 116 of an adjacent downforce controller 100 via an inter-row lift hose 416. The distal port of the lift control passage 116 of the distal downforce controller (e.g., the right-hand port of the lift control passage of the downforce controller 100-4 as illustrated in FIG. 8) is capped with a cap 450. It should be appreciated in view of FIG. 4 and the description above that a first end of the inter-row lift hose 416 is coupled to and supported by the lift control passage 116 of a first downforce controller (e.g., the downforce controller 100-1) and a second end of the inter-row lift hose 416 is coupled to and supported by the lift control passage 116 of a second, preferably adjacent downforce controller (e.g., the downforce controller 100-2).

It should be appreciated in light of FIG. 8 and the corresponding description above that each of the downforce controllers 100 (and thus the associated down chambers 136 of each of the actuators 130) are in fluid communication "in series", i.e., fluid from the supply hose 422 passes through the supply passage 112 of the downforce controller 100-1 before reaching the supply passage 112 of the downforce controller 100-2. Likewise, each of the lift chambers 134 are in fluid communication "in series", i.e., fluid from the lift control hose 426 passes through the lift control passage 116 of the downforce controller 100-1 before reaching the lift control passage 116 of the downforce controller 100-2.

It should be appreciated that a single fluid control system 400 may control all of the planter row units 200 of the planter 10 drawn by the toolbar 14, or a subset thereof. Moreover, it should be appreciated that multiple fluid control systems 400 may control separate subsets or sections of row units 200 such that the lift pressure in each section may be controlled independently. For example, three fluid control systems 400 may be used to independently control a right side section of the planter comprising a first plurality of planter row units 200 mounted to a right portion of the toolbar 14, a center section comprising a second plurality of planter row units 200 mounted to a central portion of the toolbar 14, and a left section comprising a third plurality of row units 200 mounted to a left portion of the toolbar 14.

In operation of the fluid control system 400 and the electronic control system 300, the monitor 310 receives a downforce signal from each downforce sensor 362. The monitor 310 uses the downforce signal to display the downforce measured at each planter row unit 200. The monitor 310 uses the downforce signal to select a target net downforce to be applied to each row unit 200 by each downforce controller 100. For example, if the downforce signal for a given row unit 200 is in excess of a threshold, the monitor 310 reduces the target net downforce to be applied by the corresponding controller 100. In other embodiments, the monitor 310 allows the user to simply select a target net downforce for each downforce controller 100. Once the target net downforce is selected for each downforce controller, the monitor 310 sends control signals to each down pressure control valve 140 and the lift pressure control valve 740 such that the net downforce applied by each downforce controller 100 more closely approximates the corresponding target net downforce. In some embodiments, the monitor 310 selects desired control pressures according to the methods disclosed in International Publication No. WO2013022835, the disclosure of which is hereby incorporated herein in its entirety by reference.

Figure 9:
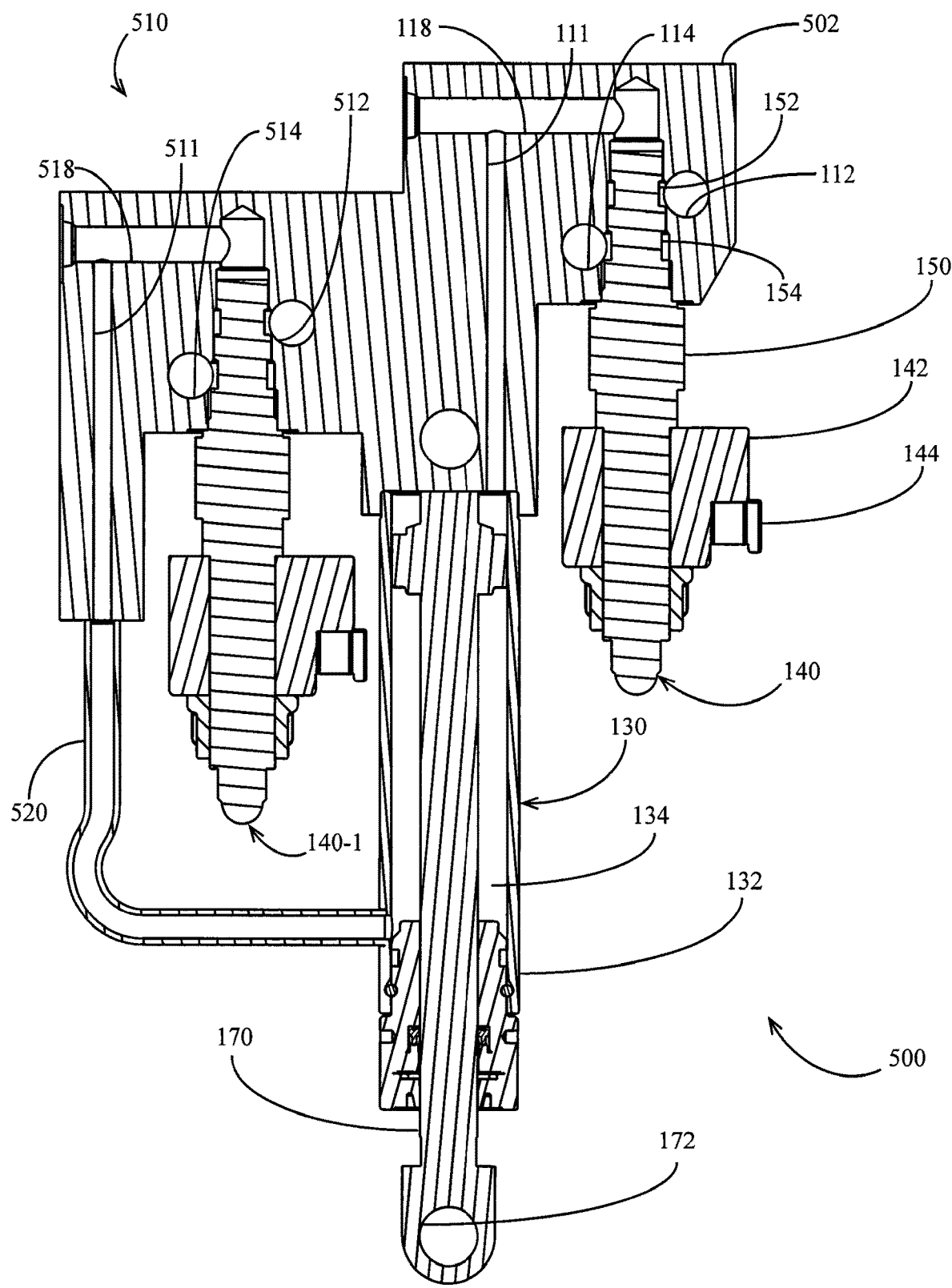
FIG. 9 is a cross-sectional view of another embodiment of a downforce controller including a lift pressure control valve.

FIG. 9 illustrates in cross-section an alternative embodiment of a hydraulic variably adjustable downforce actuator (hereinafter identified as a "downforce controller" 500). In this embodiment, the downforce controller 500 includes a modified manifold 510 and a modified conduit 520, allowing incorporation of an individual lift control valve 140-1 to control the pressure in the lift chamber 134. The individual lift pressure control valve 140-1 may be substantially similar to the pressure control valve 140. It should be appreciated that the right hand side of the manifold 510 is similar to the manifold 110 except that the lift control passage 116 is omitted.

The manifold 510 includes a manifold body 502, a lift control conduit 520, and a cavity sized to receive the individual lift pressure control valve 140-1. The manifold body 502 includes a supply passage 512 and a return passage 514. Each passage 512, 514 includes a left fitting, a right fitting, and an aperture connecting the left and right fittings. The manifold body 510 includes a control pressure diagnostic passage 518 and a down chamber connection passage 511.

The supply port of the individual lift pressure control valve 140-1 is in fluid communication with the supply passage 512. The return port of the individual lift pressure control valve 140-1 is in fluid communication with the return passage 514. The control port of the individual lift pressure control valve 140-1 is in fluid communication with the control pressure diagnostic passage 518. The control pressure diagnostic passage 518 is in fluid communication with the down chamber connection passage 511. The down chamber connection passage 511 is in fluid communication with the down chamber 136. The control pressure diagnostic passage 518 and the down chamber connection passage 511 collectively comprise a passage placing the control port of the individual lift pressure control valve 140-1 in fluid communication with the down chamber 136. The conduit 520 places the down chamber connection passage 511 in fluid communication with the lift chamber 134. The control pressure diagnostic passage 518 may be capped with a cap (not shown) which may be removed in order to place a gauge or other pressure measurement device in fluid communication with the control port of the individual lift pressure control valve 140-1.

Figure 10:
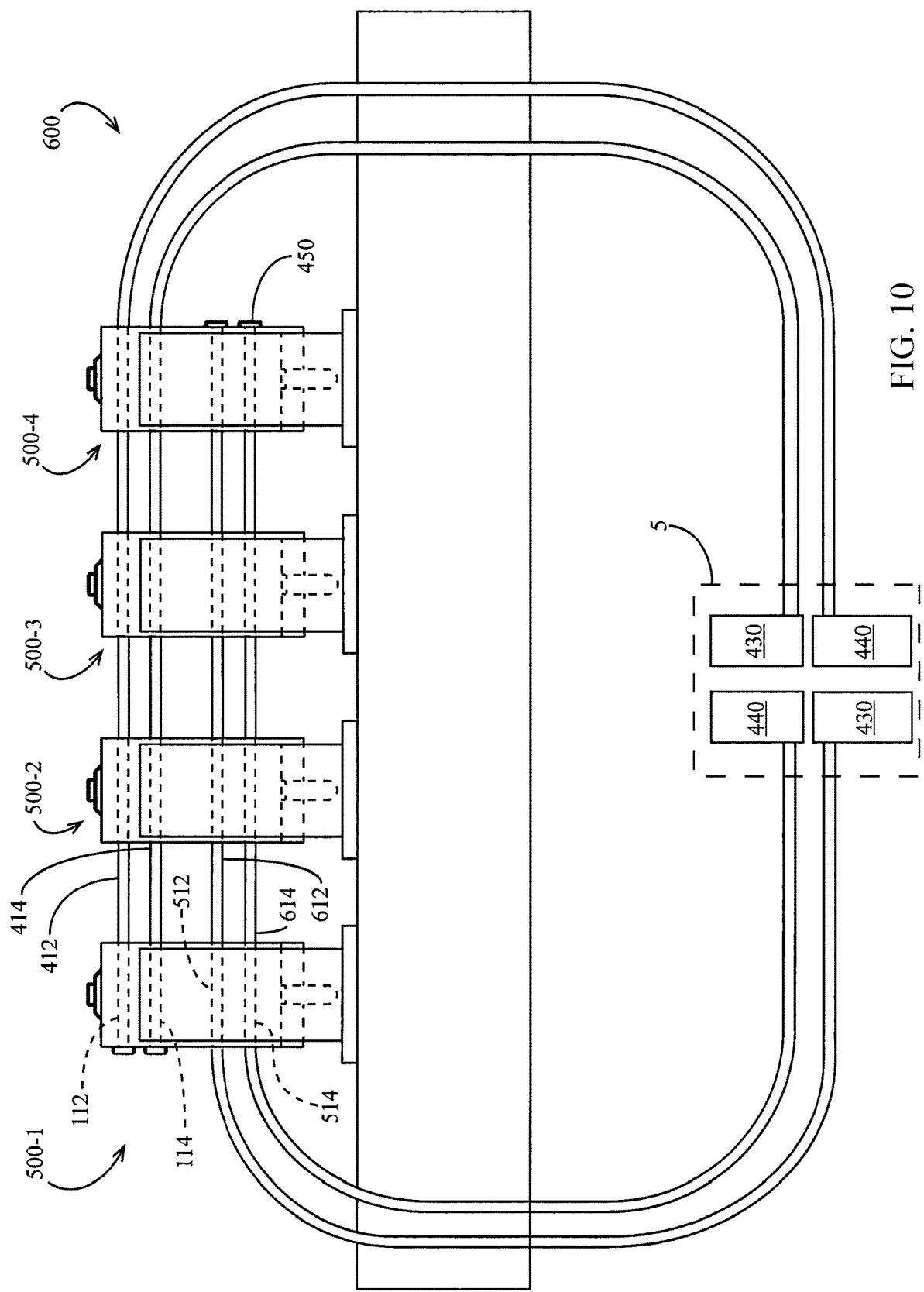
FIG. 10 is a top view of another embodiment of a fluid control system for controlling multiple downforce controllers.

Turning to FIG. 10, a modified fluid control system 600 is illustrated installed on four downforce controllers 500 each of which may be coupled to a respective row unit 200 (not shown), supported from the toolbar 14. The fluid control system 600 may include the same supply 430 and tank 440 of the tractor 5 as the fluid control system 400.

The supply passage 112 and return passage 114 of the first downforce controller 500-1 are in fluid communication with the supply 430 and the tank 440, respectively. As with the fluid control system 400, the supply passage 112 and the return passage 114 of each downforce controller 500 are in fluid communication with the supply passage 112 and the return passage 114, respectively, of an adjacent downforce controller 500 via the supply hose 412 and the return hose 414, respectively.

Similarly, the supply passage 512 and return passage 514 of the rightmost downforce controller 500-4 are in fluid communication with the supply 430 and the tank 440, respectively. The supply passage 512 and the return passage 514 of each downforce controller 500 are in fluid communication with the supply passage 512 and the return passage 514, respectively, of an adjacent downforce controller 500 via an inter-row supply hose 612 and an inter-row return hose 614, respectively.

The individual lift control valve 140-1 is in electrical communication with the monitor 130. In operation of the modified fluid control system 600, the monitor 130 is configured to select pressures of both the lift pressure control valve 140-1 and the down pressure control valve 140-1. The monitor 130 is configured to alter the commanded lift pressure and down pressure for each downforce controller 500 based on the downforce signal received from the downforce sensor 362 of the corresponding row unit 200.

In other embodiments of the downforce controller 500, the down chamber connection passage 511 is in fluid communication with the control port of the lift pressure control valve 140-1 via a pilot-operated blocking valve whose pilot pressure port is in fluid communication with the control port of the down pressure control valve 140-1 such that lift pressure is only applied when the down pressure exceeds a threshold. Similarly, in other embodiments of the downforce controller 100, the lift control passage 116 is in fluid communication with the conduit 120 via a pilot-operated blocking valve whose pilot pressure port is in fluid communication with the control port of the down pressure control valve 140 such that lift pressure is only applied when the down pressure exceeds a threshold. In such embodiments, the pilot-operated blocking valve may be housed within the manifold body.

In other embodiments of the downforce controller 100 and the downforce controller 500, the down pressure control valve 140 and/or the lift pressure control valve 740 and/or the individual lift pressure control valve 140-1 are replaced with a manually operated pressure reducing-relieving valves such that the user may manually select the lift and/or down pressure applied to each row unit 200.

In still other embodiments of the downforce controller 100, a spring is incorporated in the lift chamber 134 such that the spring is compressed as the rod 170 extends. A bottom of the spring may be adjustable from outside the cylinder (e.g., by a lockable sliding mechanism supporting an annular ring on which the spring rests) such that the user is enabled to adjust the compression and reaction force of the spring as the rod extends. In such embodiments, the conduit 120 and lift control passage 116 may be omitted.

Methods to Prevent Drift

The term "drift" should be understood to mean when any portion of either the right side 15R or the left side 15L of the toolbar 14 is further behind a transverse line 3 perpendicular to the forward direction of travel 4. It should be appreciated that the method of drift prevention described herein is not performed when the agricultural implement is in a turn, which can be determined by GPS.

In general, the method of preventing, minimizing or controlling implement drift includes measuring the forces (i.e., the downforces or moments of force) on each of the respective sides 15R, 15L of the toolbar 14, summing the forces on each side to determine a total force value on each side 15R, 15L, and then comparing each side's total force value to determine if those totaled forces values are balanced. If the totaled force values of the respective sides are not balanced causing the agricultural implement to drift due to the imbalanced forces, one or more of the variably adjustable downforce actuators (e.g., downforce controllers 100, 500 or pneumatic or electrical variably adjustable downforce actuators) on one or both of the respective sides 15R, 15L of the toolbar 14 are actuated to increase and/or decrease the downforce applied to the tools 200 or tool sections 210 until the total force values on each side 15R, 15L are balanced.

The term "balanced" as used herein means that the value of the total force on the right side 15R of the toolbar 14 and the value of the total force on the left side 15L of the toolbar 14 are the same or the difference between them is such that the difference in total force values does not cause any portion of the right side 15R of the toolbar 14 or any portion of the left side 15L of the toolbar to drift behind the transverse line 3. It should be appreciated that any combination of increasing or/or decreasing downforce applied to the tools 200 or tool sections 210 can be used to balance the forces on the respective sides while also maintaining an acceptable or sufficient amount of downforce on the tools 200 or tool sections 210 to maintain ground contact and the desired furrow depth or soil penetration depth and minimizing soil compaction.

The balancing of the forces can be accomplished through a closed loop control system or an open loop control system by changing the applied downforce that is set by the closed loop system or the open loop system.

EXAMPLE 1

Balancing Applied Downforces to Individual Tools

In embodiments such as illustrated in FIG. 1A, in which each tool 200 of the agricultural implement 10 has an associated variably adjustable downforce actuator (e.g., downforce controller 100, 500), the applied downforce acting on each tool 200 is measured. The measured downforces acting on each tool 200 on the right side 15R of the toolbar 14 are summed to determine a total right side downforce. Likewise, the downforces acting on each tool 200 on the left side 15L of the toolbar 14 are summed to determine a total left side downforce. It should be understood that the total right side and total left side downforces could be an average of the applied downforce on that side, but if there is a symmetrical number of tools 200 on the right side 15R and on the left side 15L, averaging is not needed. The total right side downforce and the total left side downforce are then compared to determine whether the total right side and total left side downforces are balanced. If the total downforces are not balanced between the right side 15R and left side 15L, then the applied downforce on the side having the lower total downforce is increased and the applied downforce on the side having the higher total downforce is decreased until the total downforce being applied to the respective sides 15R, 15L are balanced.

The balancing of the total applied downforces could be accomplished by applying half of the difference to one side to increase the downforce on that one side, and by applying half of the difference to the other side to decrease the downforce on that other side. In another embodiment, the change in the applied downforce applied to balance the forces may be divided equally across all of the tools 200 on the respective right and left sides. In yet another embodiment, a decrease in downforce to one of the sides may be accomplished provided by applying a lift force to the tools 200 on one side, thereby decreasing the total applied downforce to that side while also maintaining sufficient applied downforce within an acceptable level to maintain ground contact and desired furrow depth or soil penetration depth.

For example in a 16 row planter, if the total sum of the applied downforce to the tools or row units 200 on the right side is 320 force units (Newtons or pounds) greater than the total sum of the applied downforce to the tools or row units 200 on the left side 15L, an additional 160 force units can be applied to the row units 200 on the left side 15L, and 160 force units can be removed from the row units 200 on the right side 15R. Further, each of the eight row units 200 on the left side 15L can be increased by 20 force units, and each of the eight row units 200 on the right side 15R can each be decreased by 20 force units. Alternatively, the 320 force units can all be applied to the row units 200 on the left side section 15L to increase each row unit 200 by 40 force units.

EXAMPLE 2

Balancing Applied Downforces to Tool Sections

In embodiments such as illustrated in FIG. 1B, in which the agricultural implement 10 includes tool sections 210, the applied downforce acting on each tool section 210 is measured. There may be a single measurement of downforce for a tool section 210, or an average downforce for a tool section 210 may be used by measuring the downforce applied to each tool 200 comprising the tool section 210 and averaging the downforces of the tools 200 comprising that tool section 210. The measured or average downforce acting on each tool section 210 on the right side 15R of the toolbar 14 are summed to determine a total right side downforce. Likewise, the measured or average downforce acting on each tool section 210 on the left side 15L of the toolbar 14 are summed to determine a total left side downforce. It should be understood that the total right side and total left side downforces could be an average of the applied downforces on that side, but if there is a symmetrical number of tool sections 210 on the right side 15R and on the left side 15L, averaging of each side is not needed. The total right side downforce and the total left side downforce are then compared to determine whether the total right side and total left side downforces are balanced. If the total downforces are not balanced between the right side 15R and left side 15L, then the applied downforce on the side having the lower total downforce is increased and the applied downforce on the side having the higher total downforce is decreased until the total downforce being applied to the respective sides 15R, 15L are balanced.

The balancing of the total applied downforces could be accomplished by applying half of the difference to one side to increase the downforce on that one side, and by applying half of the difference to the other side to decrease the downforce on that other side. In another embodiment, the change in the applied downforce applied to balance the forces may be divided equally across all of the tool sections on the respective right and left sides. In yet another embodiment, a decrease in downforce to one of the sides may be accomplished provided by applying a lift force to the tool sections on one side, thereby decreasing the total applied downforce to that side while also maintaining sufficient applied downforce within an acceptable level to maintain ground contact and desired furrow depth or soil penetration depth.

For example in a 16 row planter, with four tool sections on each side (i.e., each tool section comprising two row units) if the total sum of the applied downforce to the tool section on the right side is 320 force units (Newtons or pounds) greater than the total sum of the applied downforce to the tool sections on the left side 15L, an additional 160 force units can be applied to four tool sections on the left side 15L, and 160 force units can be removed from four tool sections on the right side 15R. Further, each of the four tool sections on the left side 15L can be increased by 40 force units, and each of the four tool sections on the right side 15R can each be decreased by 40 force units. Alternatively, the 320 force units can all be applied to the four tool sections on the left side section 15L to increase each tool section by 80 force units.

EXAMPLE 3

Balancing Moments of Force

In another embodiment, the moment of force for each tool 200 or each tool section can be calculated. Each moment of force is calculated by multiplying the applied downforce to a given tool 200, or to a center of a tool section, by its lateral distance from the center point 6 of toolbar 14. The moments of force for all tools or tool sections on the right side 15R of the toolbar 14 are summed to determine a total right side moment. Likewise, the moments of force for all tools or tool sections on the left side 15L of the toolbar 14 are summed to determine a total left side moment. The total right side moment and the total left side moment are then compared, and if they are not balanced, the moments can be changed by increasing the applied downforce (and thus increasing the moments) on the side that has the lower total moment value, decreasing the applied downforce (and thus decreasing the moments) on the side that has a higher total moment value, or a combination of both. It should be appreciated that when balancing moments, changing the applied downforce on the tools 200 or tool sections at the outer lateral ends of toolbar 14 will provide the largest change in moment for a smaller change in downforce because of their greater distance from the center point 6. In one embodiment, the changes in downforce can be applied to the tools 200 or tool sections at each end of toolbar 14. In another embodiment, the changes in downforce can be applied to each of the tools 200 or tool sections on both the right side 15R and left side 15L. Alternatively, any combination can be used to create balance while also maintaining applied downforce within an acceptable level to maintain ground contact and desired furrow depth or soil penetration depth and minimizing compaction.

Diagnostic Methods

In the event of a fluid leakage in one of the cylinders 130 of the downforce controllers 100, 500, the monitor 310 may be configured to carry out one or more diagnostic processes to identify the leaking cylinder.

In a first diagnostic process, the monitor 310 may command zero or small pressure at each of the down pressure control valves 140 and commands a lift pressure to the lift pressure control valve 740 theoretically sufficient (i.e., without system leakage) to raise all of the row units 200. The monitor 310 may alerts the operator to confirm that all of the row units 200 have raised. The monitor 310 then increases the pressure commanded to each down pressure control valve 140 one at a time to a pressure theoretically sufficient to counter the lift pressure and lower the row units 200. The monitor 310 may alert the operator to verify that each row unit 200 has been lowered.

In a second diagnostic process, the monitor 310 commands a pressure the lift pressure control valve 740 sufficient to raise the row units 200 and simultaneously commands a pressure to all of the down pressure control valves 140 theoretically sufficient to retain all of the row units 200 in a lowered position. The monitor 310 may alert the operator to confirm that none of the row units 200 have raised. The monitor 310 then reduces the pressure commanded to each down pressure control valve 140 one at a time such that each row unit 200 should raise. The monitor 310 may alert the operator to verify that each row unit 200 has been raised.

In alternative embodiments of the first and second diagnostic processes, rather than (or in addition to) alerting the operator to verify that the row units 200 have raised or lowered, the monitor 310 determines whether each row unit 200 is raised or lowered by comparing the signal received from each downforce sensor 362 to a threshold value; the threshold value may correspond to a small amount of ground force (e.g., 10 pounds) on the row unit.

Various modifications to the embodiment of the apparatus, and the general principles and features of the system and methods described herein will be readily apparent to those of skill in the art. Thus, the present invention is not to be limited to the embodiments of the apparatus, system and methods described above and illustrated in the drawing figures, but is to be accorded the widest scope consistent with the scope of the appended claims.

The invention claimed is:

1. A method of preventing drift of an agricultural implement, the agricultural implement having a toolbar, the toolbar having a right side and a left side with respect to a centerline of the toolbar, a plurality of right side tools operatively supported on the right side and a plurality of left side tools operatively supported on the left side, at least one variably adjustable downforce actuator on the right side applying a downforce to the plurality of right side tools, at least one variably adjustable downforce actuator on the left side applying a downforce to the plurality of left side tools, the method comprising:
   determining a right side total force value based on measured downforces applied on the plurality of right side tools;
   determining a left side total force value based on measured downforces applied on the plurality of left side tools;
   comparing the right side total force value and the left side total force value to determine a total force difference; and
   if the total force difference exceeds a preselected threshold, adjusting at least one of the right and left side total force to balance the right side total force value and the left side total force value.

2. The method of claim 1, wherein adjusting at least one of the right and left side total force includes, for a side having a lower total force value, increasing the downforces by the total force difference on the side having a lower total force value.

3. The method of claim 1, wherein adjusting at least one of the right and left side total force includes, for a side having a higher total force value, decreasing the downforces by the total force difference on the side having a higher total force value.

4. The method of claim 1, wherein adjusting at least one of the right and left side total force includes, for a side having a lower total force value, increasing the downforces by half of the total force difference on the side having a lower total force value, and for a side having a higher total force value, decreasing the downforces by half of the total force difference on the side having a higher total force value.

5. The method of claim 1, wherein each of the plurality of right side tools and each of the plurality of left side tools has an associated variably adjustable downforce actuator.

6. The method of claim 5, wherein determining the right side total force value includes summing the measured downforces of each of the plurality of right side tools, and wherein determining the left side total force value includes summing the measured downforces of each of the plurality of left side tools.

7. The method of claim 6, wherein adjusting at least one of the right and left side total force includes, for a side having a lower total force value, increasing the downforces by the total force difference divided equally among each of the variably adjustable downforce actuators on the side having a lower total force value.

8. The method of claim 6, wherein adjusting at least one of the right and left side total force includes, for a side having a higher total force value, decreasing the downforces by the total force difference divided equally among each of the variably adjustable downforce actuators on the side having a higher total force value.

9. The method of claim 6, wherein adjusting at least one of the right and left side total force includes, for a side having a lower total force value, increasing the downforces by half of the total force difference divided equally among each of the variably adjustable downforce actuators on the side having a lower total force value, and for a side having a higher total force value, decreasing the downforces by half of the total force difference divided equally among each of the variably adjustable downforce actuators on the side having a higher total force value.

10. The method of claim 1, wherein the plurality of right side tools comprise multiple right side tool sections and wherein the plurality of left side tools comprise multiple left side tool sections, and wherein each of the multiple right side tool sections and each of a the multiple left side tool sections has an associated variably adjustable downforce actuator.

11. The method of claim 10, wherein determining the right side total force value includes summing the measured downforces of each of the multiple right side tool sections and wherein determining the left side total force value includes summing the measured downforces of each the multiple left side tool sections.

12. The method of claim 11, wherein adjusting at least one of the right and left side total force includes, for a side having a lower total force value, increasing the downforces by the total force difference divided equally among each of the variably adjustable downforce actuators on the side having a lower total force value.

13. The method of claim 11, wherein adjusting at least one of the right and left side total force includes, for a side having a higher total force value, decreasing the downforces by the total force difference divided equally among each of the variably adjustable downforce actuators on the side having a higher total force value.

14. The method of claim 11, wherein adjusting at least one of the right and left side total force includes, for a side having a lower total force value, increasing the downforces by half of the total force difference divided equally among each of the variably adjustable downforce actuators on the side having a lower total force value, and for a side having a higher total force value, decreasing the downforces by half of the total force difference divided equally among each of the variably adjustable downforce actuators on the side having a higher total force value.

15. The method of claim 1, wherein determining the right side total force includes summing moments of force of the right side and wherein determining the left side total force includes summing moments of force of the left side.

16. The method of claim 15, wherein adjusting at least one of the right and left side total force includes, for a side having a lower total force value, increasing the moment of force by the total force difference on the side having a lower total force value.

17. The method of claim 16, wherein adjusting at least one of the right and left side total force includes, for a side having a higher total force, decreasing the moment of force by the total force difference on the side having a higher total force value.

18. The method of claim 16, wherein adjusting at least one of the right and left side total force includes, for a side having a lower total force value, increasing the moment of force by half of the total force difference on the side having a lower total force value, and for a side having a higher total force, decreasing the moment of force by half of the total force difference on the side having a higher total force value.

* * * * *